United States Patent
Nagata et al.

(10) Patent No.: US 9,055,480 B2
(45) Date of Patent: Jun. 9, 2015

(54) MOBILE COMMUNICATION METHOD AND RADIO BASE STATION

(75) Inventors: Satoshi Nagata, Tokyo (JP); Tetsushi Abe, Tokyo (JP); Naoto Ookubo, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 12 days.

(21) Appl. No.: 13/988,074

(22) PCT Filed: Nov. 18, 2011

(86) PCT No.: PCT/JP2011/076632
§ 371 (c)(1),
(2), (4) Date: May 17, 2013

(87) PCT Pub. No.: WO2012/067221
PCT Pub. Date: May 24, 2012

(65) Prior Publication Data
US 2013/0237235 A1  Sep. 12, 2013

(30) Foreign Application Priority Data
Nov. 18, 2010  (JP) .................................. 2010-257708

(51) Int. Cl.
H04W 72/00  (2009.01)
H04W 24/10  (2009.01)
H04W 72/12  (2009.01)
H04L 5/00  (2006.01)

(52) U.S. Cl.
CPC .......... *H04W 24/10* (2013.01); *H04W 72/1289* (2013.01); *H04L 5/0048* (2013.01)

(58) Field of Classification Search
USPC ....................................................... 455/450
See application file for complete search history.

(56) References Cited

U.S. PATENT DOCUMENTS

2010/0322097 A1* 12/2010 Jen ................................. 370/252
2011/0281615 A1  11/2011 Yamada et al.

FOREIGN PATENT DOCUMENTS

CN          102045149 A    5/2011
WO       2010073830 A1    7/2010

OTHER PUBLICATIONS

International Search Report issued in PCT/JP2011/076632 mailed Jan. 17, 2012 (2 pages).
Huawei, HiSilicon, "Remaining details on CSI RS", 3GPP TSG RAN WG1 meeting #63; R1-105840; Jacksonville, USA; Nov. 15-19, 2010 (12 pages).
Huawei et al., "Way Forward on CSI-RS signalling for FDD and TDD", 3GPP TSG RAN WG1 #62bis; R1-105795; Xi'an, China; Oct. 11-15, 2010 (5 pages).
Qualcomm Incorporated, "Applicability of muting to certain messages", 3GPP TSG-RAN WG1 #63; R1-106353; Jacksonville, USA; Nov. 15-19, 2010 (4 pages).
Examination Report issued in corresponding Canadian Application No. 2818155, mailed Jan. 27, 2015 (3 pages).
Office Action issued in corresponding Chilean Application 1407-13, mailed Feb. 25, 2015, with English communication reporting the same (8 pages).

\* cited by examiner

*Primary Examiner* — Joel Ajayi
(74) *Attorney, Agent, or Firm* — Osha Liang LLP

(57) ABSTRACT

A mobile communication method according to the present invention includes a step A of notifying, by a radio base station eNB, a mobile station UE during communication in a subordinate cell #1 of "CSI-RS/Muting configuration information" indicating a transmission method of CSI-RS; and a step B of performing, by the mobile station UE, a reception process on the basis of the "CSI-RS/Muting configuration information".

15 Claims, 2 Drawing Sheets

MOBILE COMMUNICATION METHOD AND RADIO BASE STATION

TECHNICAL FIELD

The present invention relates to a mobile communication method and a radio base station.

BACKGROUND ART

In Release-8 version of LTE (Long Term Evolution), it is defined that CRS (Common Reference Signal) common among cells is transmitted in a downlink.

The CRS is used for the measurement of mobility or the measurement of channel quality information (CQI: Channel Quality Indicator) in a mobile station UE, in addition to a demodulation process of downlink data.

Furthermore, in LTE Release-10 version, it is defined that CSI-RS (Channel State Information-Reference Signal) common among cells and dedicated for CQI measurement is transmitted in addition to the CRS.

Moreover, in the LTE Release-10 version, for the improvement of the accuracy of channel estimation between neighboring cells through the CSI-RS, in order that the CSI-RS and a downlink data channel (PDSCH: Physical Downlink Shared Channel) are not collided between the neighboring cells, it is defined to use a scheme (that is, Muting) for performing scheduling in which the PDSCH of the neighboring cell is not assigned to a subframe for transmitting the CSI-RS.

Furthermore, it is discussed that a radio base station eNB notifies a mobile station UE of "CSI-RS/Muting configuration information" indicating a transmission method (for example, a pattern, a cycle, or a subframe offset value of CSI-RS/Muting) of the above-described CSI-RS.

CITATION LIST

Non Patent Literature

[NPL 1] 3GPP contribution R1-105840
[NPL 2] 3GPP contribution R1-106353

SUMMARY OF INVENTION

Technical Problem

However, in the LTE Release-10 version, there is a problem that a timing for starting the transmission (and the Muting) of the CSI-RS has not been defined.

Therefore, the present invention has been achieved in view of the above-described problems, and an object thereof is to provide a mobile communication method and a radio base station, by which it is possible to start the transmission of CSI-RS at an appropriate timing.

Solution to Problem

A first characteristic of the present invention is summarized in that a mobile communication method, in which a radio base station transmits a reference signal dedicated for measuring channel quality information in a subordinate cell, includes: a step A of notifying, by the radio base station, a mobile station during communication in the subordinate cell of configuration information indicating a transmission method of the reference signal; a step B of performing, by the mobile station, a reception process on the basis of the configuration information after a connection reconfiguration signal is received from the radio base station; and a step C of starting, by the radio base station, the transmission of downlink data in a subframe for transmitting the reference signal after a response for the connection reconfiguration signal is received from the mobile station.

A second characteristic of the present invention is summarized in that a radio base station, that transmits a reference signal dedicated for measuring channel quality information in a subordinate cell, includes: a transmission unit that notifies a mobile station during communication in the subordinate cell of configuration information indicating a transmission method of the reference signal, wherein the transmission unit is configured to start the transmission of downlink data in a subframe for transmitting the reference signal after a response for a connection reconfiguration signal is received from the mobile station.

Advantageous Effects of Invention

As described above, according to the present invention, it is possible to provide a mobile communication method and a radio base station with which it is possible to start the transmission of CSI-RS at an appropriate timing.

DESCRIPTION OF EMBODIMENTS (Mobile Communication System According to First Embodiment of the Present Invention)

Figure 1:
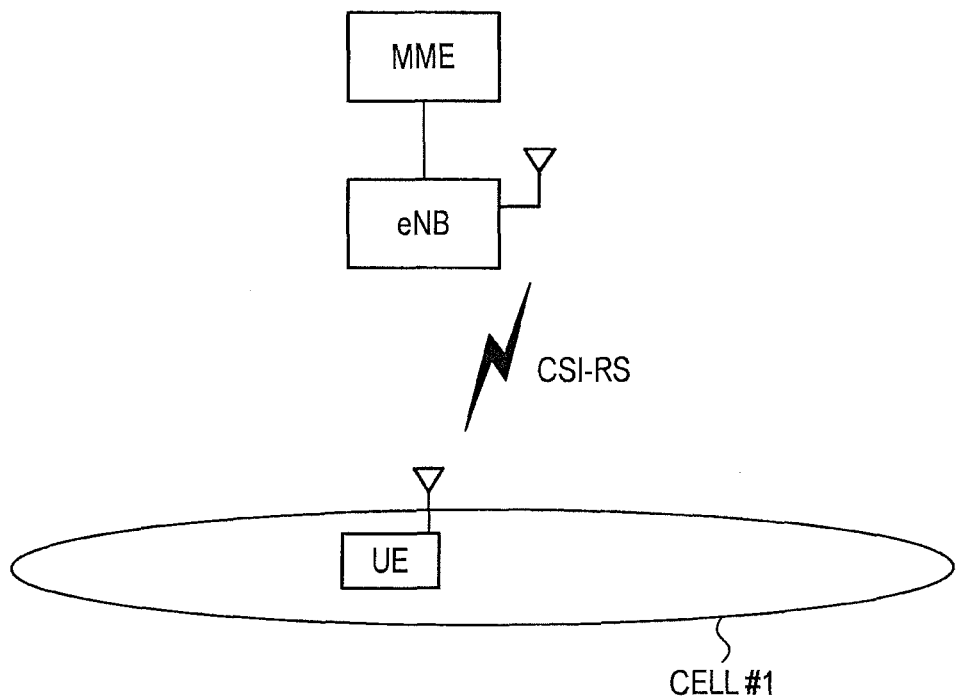
FIG. 1 is a diagram illustrating an entire configuration of a mobile communication system according to a first embodiment of the present invention.
Figure 2:
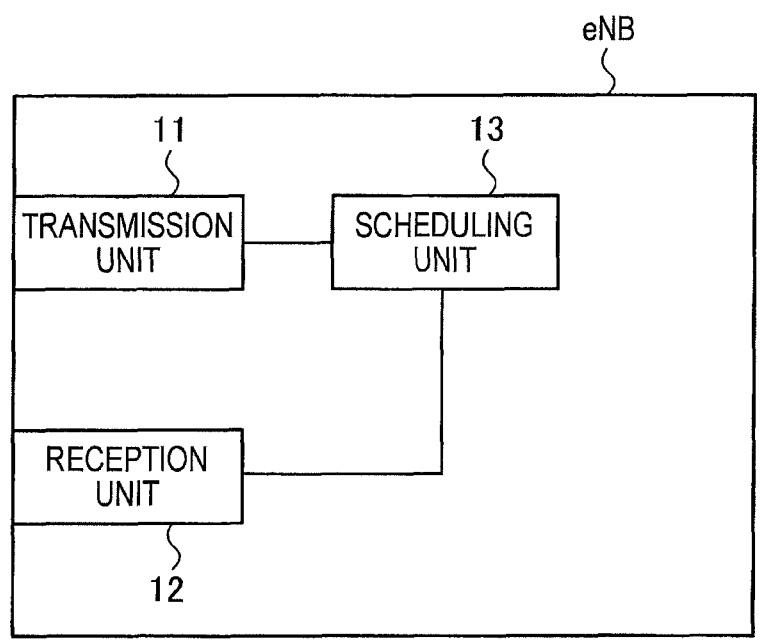
FIG. 2 is a functional block diagram of a radio base station according to the first embodiment of the present invention.
Figure 3:
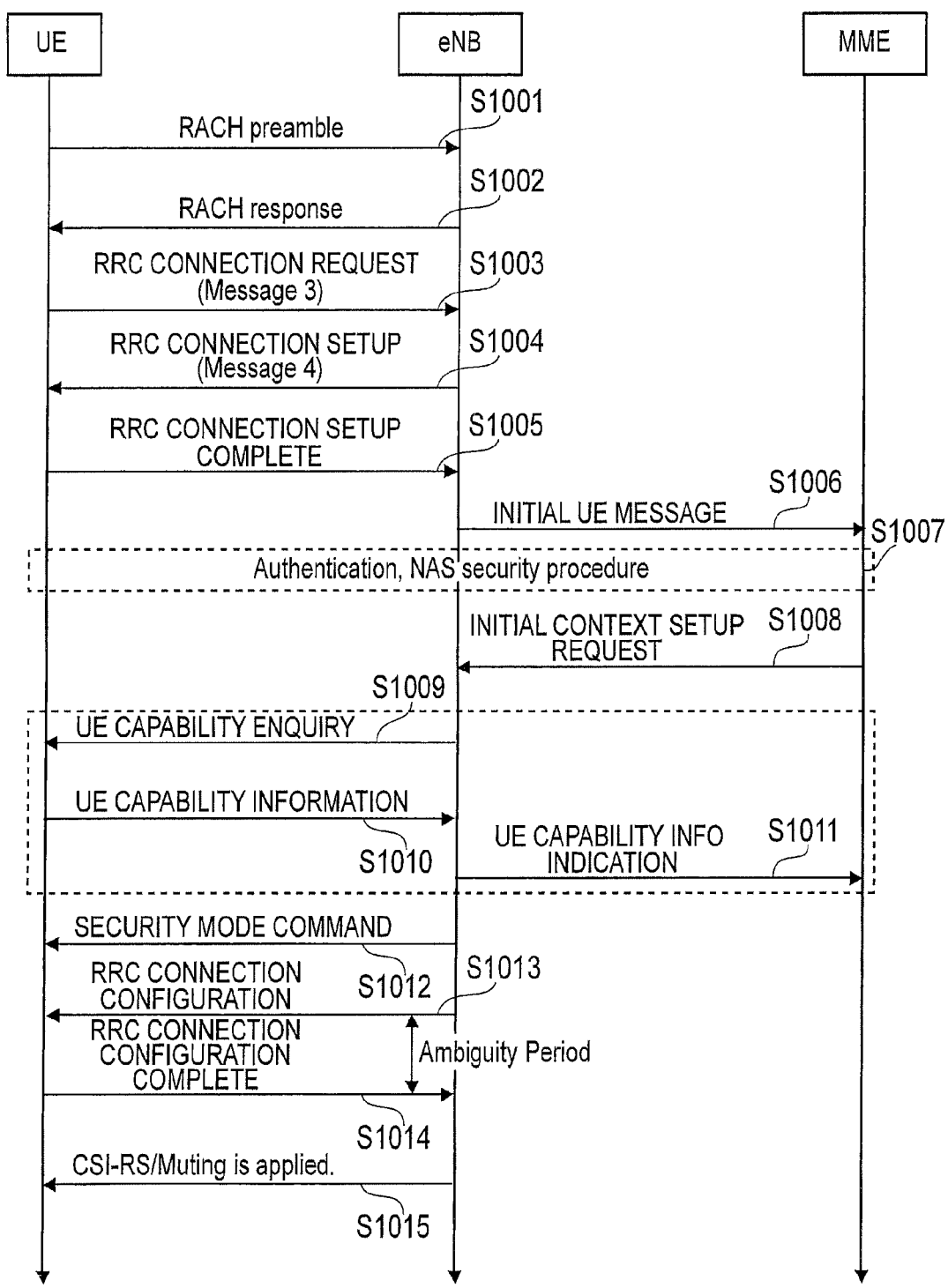
FIG. 3 is a sequence diagram illustrating an operation of a mobile communication system according to the first embodiment of the present invention.

With reference to FIG. 1 to FIG. 3, a mobile communication system according to a first embodiment of the present invention will be described. In the present embodiment, a mobile communication system employing an LTE Release-10 version will be described as an example of the mobile communication system according to the present embodiment. However, the present invention is also applicable to mobile communication systems other than the LTE mobile communication system.

That is, as illustrated in FIG. 1, in the mobile communication system according to the present embodiment, a radio base station eNB #1 is configured to be able to transmit CSI-RS in a subordinate cell #1 thereof.

Furthermore, the cell #1 may be a macro cell or a CSG (Closed Subscriber Group) cell. In addition, the CSG cell may be called a Femto cell, a Micro cell, or a Pico cell.

As illustrated in FIG. 2, the radio base station eNB #1 includes a transmission unit 11, a reception unit 12, and a scheduling unit 13. The transmission unit 11 is configured to transmit downlink data to a mobile station UE during communication in the subordinate cell #1 through PDSCH.

Furthermore, the transmission unit 11 is configured to transmit the CSI-RS in the subordinate cell #1.

Moreover, the transmission unit 11 is configured to notify the mobile station UE during communication in the subordinate cell #1 of "CSI-RS/Muting configuration information".

The "CSI-RS/Muting configuration information" includes a pattern, a cycle, or a subframe offset value of CSI-RS/Muting.

Specifically, the transmission unit 11 may be configured to notify the "CSI-RS/Muting configuration information" through an RRC message such as "RRC CONNECTION CONFIGURATION".

Alternatively, the transmission unit 11 may also be configured to notify the "CSI-RS/Muting configuration information" through a broadcast signal (SIB: System Information Block).

Furthermore, the transmission unit 11 may also be configured to start the transmission of downlink data in a subframe for transmitting the CSI-RS after "RRC CONNECTION CONFIGURATION COMPLETE" is received from the mobile station UE.

Furthermore, the transmission unit 11 may also be configured to start to stop (that is, Muting) the transmission of the downlink data of a neighboring cell in the subframe for transmitting the CSI-RS after the "RRC CONNECTION CONFIGURATION COMPLETE" is received from the mobile station UE.

Furthermore, the transmission unit 11 may also be configured to start the transmission and Muting (CSI-RS/Muting) of the downlink data in the subframe for transmitting the CSI-RS, that is, "Rate Matching", after a predetermined period passes from the transmission of the "RRC CONNECTION CONFIGURATION".

Furthermore, the transmission unit 11 may also be configured to determine whether to notify the mobile station UE of the "CSI-RS/Muting configuration information" on the basis of capability of the mobile station UE.

For example, the transmission unit 11 may also be configured to determine whether to notify the mobile station UE of the "CSI-RS/Muting configuration information" on the basis of a release number of the mobile station UE, which is included in "UE CAPABILITY INFORMATION" received from the mobile station UE.

Alternatively, the transmission unit 11 may also be configured to determine whether to notify the mobile station UE of the "CSI-RS/Muting configuration information" on the basis of a release number of the mobile station UE, which is included in "UE CAPABILITY" included in "INITIAL CONTEXT SETUP REQUEST" received from a mobility management node MME.

That is, the transmission unit 11 may also be configured to notify only a mobile station UE employing the LTE Release-10 version of the "CSI-RS/Muting configuration information", and configured not to notify a mobile station UE employing the LTE Release-8/9 version of the "CSI-RS/Muting configuration information".

The reception unit 12 is configured to receive a message such as "RRC CONNECTION CONFIGURATION COMPLETE" or "UE CAPABILITY INFORMATION" from the mobile station UE during communication in the subordinate cell #1.

The scheduling unit 13 is configured to perform a scheduling process for the mobile station UE during communication in the subordinate cell #1.

For example, the scheduling unit 13 performs scheduling in which PDSCH addressed to the mobile station UE employing the LTE Release-10 version is not assigned to the subframe for transmitting the CSI-RS until the "RRC CONNECTION CONFIGURATION COMPLETE" is received by the reception unit 12.

That is, the transmission unit 11 is configured not to transmit downlink data addressed to the mobile station UE employing the LTE Release-10 version, in the subframe in which the CSI-RS is transmitted, until the "RRC CONNECTION CONFIGURATION COMPLETE" is received by the reception unit 12.

Meanwhile, the scheduling unit 13 always performs scheduling in which the PDSCH addressed to the mobile station UE employing the LTE Release-8/9 version is not assigned to the subframe for transmitting the CSI-RS.

That is, the transmission unit 11 is configured not to always transmit downlink data addressed to the mobile station UE employing the LTE Release-8/9 version in the subframe for transmitting the CSI-RS.

With reference to FIG. 3, the operation of the mobile communication system according to the present embodiment will be explained, below.

As illustrated in FIG. 3, in step S1001, the mobile station UE transmits "RACH preamble" to the radio base station eNB, and in step S1002, the radio base station eNB transmits "RACH response" to the mobile station UE.

In step S1003, the mobile station UE transmits "RRC CONNECTION REQUEST (Message 3)" to the radio base station eNB, and in step S1004, the radio base station eNB transmits "RRC CONNECTION SETUP (Message 4)" to the mobile station UE.

In step S1005, the mobile station UE transmits "RRC CONNECTION SETUP COMPLETE" to the radio base station eNB, and in step S1006, the radio base station eNB transmits "INITIAL UE MESSAGE" to the mobility management node MME.

In step S1007, "Authentication" or "NAS security procedure" is performed between the mobile station UE and the mobility management node MME, and in step S1008, the mobility management node MME transmits "INITIAL CONTEXT SETUP REQUEST" to the radio base station eNB.

Furthermore, when "UE CAPABILITY" is not included in the "INITIAL CONTEXT SETUP REQUEST", the radio base station eNB transmits "UE CAPABILITY ENQUIRY" to the mobile station UE in step S1009, the mobile station UE transmits "UE CAPABILITY INFORMATION" to the radio base station eNB in step S1010, and the radio base station eNB transmits "UE CAPABILITY INFO INDICATION" to the mobility management node MME in step S1011.

In step S1012, the radio base station eNB transmits "SECURITY MODE COMMAND" to the mobile station UE.

In addition, when the radio base station eNB determines that the mobile station UE is a mobile station UE employing the LTE Release-10 version on the basis of the "UE CAPABILITY", the radio base station eNB transmits "RRC CONNECTION CONFIGURATION" including "CSI-RS/Muting configuration information" to the mobile station UE in step S1013.

In step S1014, the mobile station UE transmits "RRC CONNECTION CONFIGURATION COMPLETE" to the radio base station eNB.

After the "RRC CONNECTION CONFIGURATION COMPLETE" is received, that is, after "Ambiguity Period" passes, the radio base station eNB starts the transmission of downlink data addressed to the mobile station UE in a subframe for transmitting CSI-RS and starts to stop (CSI-RS/Muting) the transmission of downlink data of a neighboring cell, that is, "Rate Matching", in step S1015.

Furthermore, the mobile station UE performs a reception process (for example, a demodulation process) on the basis of the "CSI-RS/Muting configuration information".

For example, the mobile station UE may perform "Rate Matching" according to the arrangement of the CSI-RS as the reception process.

Specifically, the mobile station UE is configured to perform, as the reception process, "Rate Matching" for PDSCH in the vicinity of RE (Resource Element) for which the CSI-RS/Muting is performed.

Alternatively, the mobile station UE may be configured to perform, as the reception process, channel measurement using the CSI-RS.

In accordance with the mobile communication system according to the present embodiment, after "RRC CONNECTION CONFIGURATION COMPLETE" is received from the mobile station UE, the radio base station eNB starts to the transmission of downlink data addressed to the mobile station UE in a subframe for transmitting CSI-RS and to stop the transmission of downlink data of a neighboring cell, thereby appropriately performing the transmission of the CSI-RS.

Furthermore, in the conventional LTE scheme, there is a problem that "CSI-RS/Muting configuration information" is broadcasted to all mobile stations UE although only a mobile station UE employing the LTE Release-10 version is able to receive the CSI-RS and a mobile station UE employing the LTE Release-8/9 version is not able to receive the CSI-RS.

On the other hand, in accordance with the mobile communication system according to the present embodiment, a mobile station UE during communication in the subordinate cell #1 is configured to be notified of the "CSI-RS/Muting configuration information" through an RRC message (an individual message) such as "RRC CONNECTION CONFIGURATION", so that it is possible to realize CSI-RS/Muting without broadcasting invalid information.

The characteristics of the present embodiment as described above may be expressed as follows.

A first characteristic of the present embodiment is summarized in that a mobile communication method, in which a radio base station eNB transmits CSI-RS (a reference signal dedicated for measuring channel quality information) in a subordinate cell #1, includes: a step A of notifying, by the radio base station eNB, a mobile station UE during communication in the subordinate cell #1 of "CSI-RS/Muting configuration information (configuration information)" indicating a transmission method of the CSI-RS; a step B of performing, by the mobile station UE, a reception process on the basis of the "CSI-RS/Muting configuration information" after "RRC CONNECTION CONFIGURATION (a connection reconfiguration signal)" is received from the radio base station eNB; and a step C of starting, by the radio base station eNB, the transmission of downlink data in a subframe for transmitting CSI-RS after "RRC CONNECTION CONFIGURATION COMPLETE (a response for the connection reconfiguration signal)" is received from the mobile station UE.

In the first characteristic of the present embodiment, the "CSI-RS/Muting configuration information" may be included in "SIB (a broadcast signal)".

In the first characteristic of the present embodiment, the "CSI-RS/Muting configuration information" may be included in the "RRC CONNECTION CONFIGURATION".

In the first characteristic of the present embodiment, in the step B, the mobile station UE may perform rate matching according to the arrangement of the CSI-RS as the reception process.

In the first characteristic of the present embodiment, in the step B, the mobile station UE may perform channel measurement using the CSI-RS, as the reception process.

In the first characteristic of the present embodiment, in the step A, the radio base station eNB may determine whether to notify the mobile station UE of the "CSI-RS/Muting configuration information" on the basis of capability of the mobile station UE (for example, a release number of the mobile station UE).

A second characteristic of the present embodiment is summarized in that a radio base station eNB, which is configured to be able to transmit CSI-RS in a subordinate cell #1, includes: a transmission unit 11 that notifies a mobile station UE during communication in the subordinate cell #1 of "CSI-RS/Muting configuration information", wherein the transmission unit 11 is configured to start the transmission of downlink data in a subframe for transmitting the CSI-RS after "RRC CONNECTION CONFIGURATION COMPLETE" is received from the mobile station UE.

In the second characteristic of the present embodiment, the transmission unit 11 may be configured to notify the "CSI-RS/Muting configuration information" through SIB.

In the second characteristic of the present embodiment, the transmission unit 11 may be configured to notify the "CSI-RS/Muting configuration information" through "RRC CONNECTION CONFIGURATION".

In the second characteristic of the present embodiment, the transmission unit 11 may be configured to determine to notify the mobile station UE of the "CSI-RS/Muting configuration information" on the basis of capability of the mobile station UE (for example, a release number of the mobile station UE).

In addition, the operations of the above-described mobility management node MME, radio base stations eNB, or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. Such an ASIC may be arranged in the mobility management node MME, the radio base stations eNB, or the mobile station UE. As a discrete component, such a storage medium and processor may be arranged in the mobility management node MME, the radio base stations eNB, or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

UE . . . Mobile station
MME . . . Mobile management node
eNB . . . Radio base station
11 . . . Transmission unit 12 ... Reception unit
13 ... Scheduling unit

The invention claimed is:

1. A mobile communication method, in which a radio base station transmits a reference signal dedicated for measuring channel quality information in a subordinate cell, comprising:
   a step A of notifying, by the radio base station, a mobile station during communication in the subordinate cell of configuration information indicating a transmission method of the reference signal;
   a step B of performing, by the mobile station, a reception process on the basis of the configuration information after a connection reconfiguration signal is received from the radio base station;
   a step C of muting, by the radio base station, downlink data in a subframe in which the reference signal is transmitted; and
   a step D of starting, by the radio base station, a transmission process of downlink data after a response signal of the connection reconfiguration signal is received from the mobile station.

2. The mobile communication method according to claim 1, wherein the configuration information is included in the connection reconfiguration signal.

3. The mobile communication method according to claim 1, wherein in the step B, the mobile station performs rate matching according to arrangement of the reference signal as the reception process.

4. The mobile communication method according to claim 1, wherein in the step B, the mobile station performs channel measurement using the reference signal, as the reception process.

5. The mobile communication method according to claim 1, wherein in the step A, the radio base station notifies the mobile station of the configuration information, the mobile station having capability corresponding to a predetermined release number.

6. A radio base station that transmits a reference signal dedicated for measuring channel quality information in a subordinate cell, comprising:
   a transmission unit that notifies a mobile station during communication in the subordinate cell of configuration information indicating a transmission method of the reference signal, wherein
   the transmission unit is configured to mute downlink data in a subframe in which the reference signal is transmitted and start a transmission process of downlink data after a response signal of the connection reconfiguration signal is received from the mobile station.

7. The radio base station according to claim 6, wherein the transmission unit is configured to notify the configuration information through a connection reconfiguration signal.

8. The radio base station according to claim 6, wherein the transmission unit is configured to determine whether to notify the mobile station of the configuration information, the mobile station having capability corresponding to a predetermined release number.

9. A mobile communication system configured such that a radio base station transmits a reference signal dedicated for measuring channel quality information in a subordinate cell, wherein the radio base station comprises:
   a transmission unit that notifies a mobile station during communication in the subordinate cell of configuration information indicating a transmission method of the reference signal, wherein
   the mobile station is configured to perform a reception process on the basis of the configuration information after a connection reconfiguration signal is received from the radio base station; and
   the transmission unit is configured to mute downlink data in a subframe in which the reference signal is transmitted and start a transmission process of downlink data after a response signal of the connection reconfiguration signal is received from the mobile station.

10. The radio base station according to claim 7, wherein the transmission unit is configured to determine whether to notify the mobile station of the configuration information, the mobile station having capability corresponding to a predetermined release number.

11. The mobile communication method according to claim 2, wherein in the step A, the radio base station notifies the mobile station of the configuration information, the mobile station having capability corresponding to a predetermined release number.

12. The mobile communication method according to claim 3, wherein in the step A, the radio base station notifies the mobile station of the configuration information, the mobile station having capability corresponding to a predetermined release number.

13. The mobile communication method according to claim 4, wherein in the step A, the radio base station notifies the mobile station of the configuration information, the mobile station having capability corresponding to a predetermined release number.

14. The mobile communication method according to claim 2, wherein in the step B, the mobile station performs rate matching according to arrangement of the reference signal as the reception process.

15. The mobile communication method according to claim 2, wherein in the step B, the mobile station performs channel measurement using the reference signal, as the reception process.

* * * * *